United States Patent
Retz et al.

(10) Patent No.: US 6,817,571 B2
(45) Date of Patent: Nov. 16, 2004

(54) INTEGRATED AIRCRAFT WINDSHIELDS AND ASSOCIATED METHODS

(75) Inventors: Kevin M. Retz, Bothell, WA (US); Nicholaas Voogt, Bothell, WA (US); Michael G. Friend, Seattle, WA (US); Christopher R. Holtorf, Marysville, WA (US); Mannon L. Wallace, Lynnwood, WA (US); Andrew Sones, Bothell, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/681,790

(22) Filed: Oct. 8, 2003

(65) Prior Publication Data

US 2004/0069903 A1 Apr. 15, 2004

Related U.S. Application Data

(60) Provisional application No. 60/420,858, filed on Oct. 23, 2002, and provisional application No. 60/417,885, filed on Oct. 10, 2002.

(51) Int. Cl.[7] .................................................. B64C 1/14
(52) U.S. Cl. ........................ 244/15; 244/129.3; 244/119
(58) Field of Search ............................ 244/129.3, 119, 244/117 R, 73 R, 15

(56) References Cited

U.S. PATENT DOCUMENTS

| | | | |
|---|---|---|---|
| 2,084,790 A | | 6/1937 | Canney |
| 3,146,971 A | * | 9/1964 | Walker et al. ................ 244/15 |
| 4,741,497 A | * | 5/1988 | Fox ........................ 244/117 R |
| 4,828,204 A | * | 5/1989 | Friebel ........................ 244/15 |
| 5,114,097 A | | 5/1992 | Williams |
| 5,529,263 A | * | 6/1996 | Rudolph ....................... 244/55 |
| 5,676,333 A | * | 10/1997 | Rethorst ...................... 244/15 |
| 6,213,428 B1 | * | 4/2001 | Chaumel et al. ............ 244/119 |
| 6,575,406 B2 | | 6/2003 | Nelson |

FOREIGN PATENT DOCUMENTS

WO    WO 97/30444    7/1998

OTHER PUBLICATIONS

4—4:Bombardier Global Express (2 pages) http://home.ca.inter.net/~rapickler/global.html [Accessed Sep. 26, 2003].
Photo of B–29A 44–62220 (originally at Kelly AFB, Now at Lackland AFB) (1 page) http://proft.50megs.com/b-29-kh.jpg [Accessed Sep. 24, 2003].
International Search Report for International Application No. PCT/US03/31609; Applicant: The Boeing Company; 8 pgs.
Warwick, G., "Sonic Orders Set for 2002 Lift Off", Flight International, Reed Business Information, Haywards Heath, GB, vol. 159, No. 4778; May 1, 2001, p. 7.
"Uncertainty Threatens to Delay Sonic Cruiser", Flight International, Reed Business Information, Haywards Heath, GB, vol. 162, No. 4842, Jul. 30, 2002, p. 11.

* cited by examiner

Primary Examiner—Galen Barefoot
(74) Attorney, Agent, or Firm—Perkins Coie LLP

(57) ABSTRACT

Aircraft having cab portions with integrated windshields are disclosed. The cab portion can include a rounded nose and a windshield positioned above and aft of a forward extremity of the rounded nose. A contour of the cab portion extending from the nose over the windshield aft of the nose can have a generally continuously smooth, unkinked shape. In particular embodiments, the portion of the contour corresponding to the windshield can be convex when viewed from a position external to the cab portion, and the shape of the windshield can form a portion of a conical surface.

15 Claims, 5 Drawing Sheets

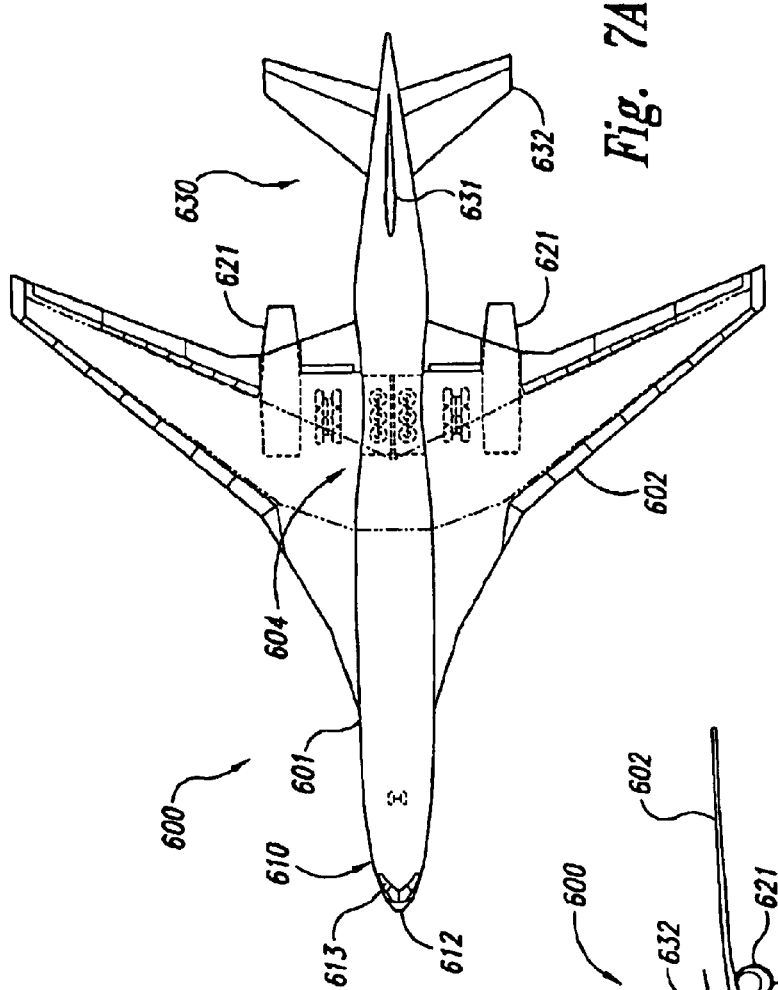
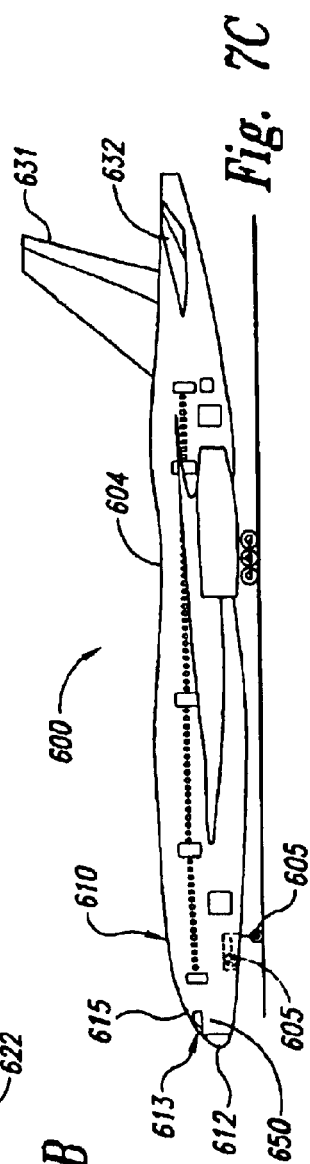
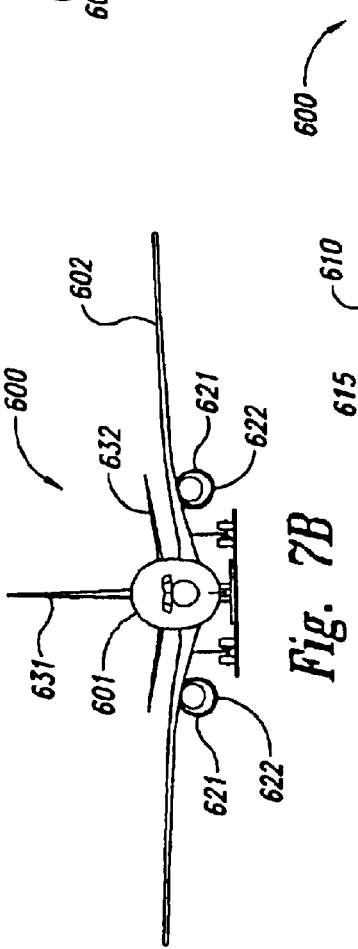

INTEGRATED AIRCRAFT WINDSHIELDS AND ASSOCIATED METHODS

CROSS-REFERENCE TO RELATED APPLICATIONS

The present application claims priority to pending U.S. Provisional Application Nos. 60/420,858 filed Oct. 23, 2002 and 60/417,885, filed Oct. 10, 2002, both of which are incorporated herein in their entireties by reference.

TECHNICAL FIELD

This invention relates generally to integrated windshields and cab portions for aircraft, including high-speed aircraft, and associated methods.

BACKGROUND

Cab sections for current commercial airliners and business jets typically have a kink or bend in the contour of the fuselage just below the windshield. In some cases, the kink is provided to allow a more upright position for the windshield, which can reduce the accumulation of dust and other debris on the windshield, and/or windshield glare. This arrangement can also reduce the overall size of the windshield. FIGS. 1A and 1B illustrate an existing cab portion 10 having an existing windshield 13 and an existing contour 15 with a kink at the lower edge of the windshield 13. Pilots seated in the cab portion 10 have a reference eye position 17, and a field of vision 16 through the windshield 13.

One drawback with the arrangement shown in FIGS. 1A–1B is that the kink at the junction between the windshield 13 and the external surface of the cab portion 10 can increase the manufacturing complexity of the fuselage and can increase the loads transmitted to the aircraft airframe and/or windshield. Another drawback is that the kink can also increase the noise level in the cockpit by causing a disturbance in the airflow around the cab.

SUMMARY

The present invention is directed toward cab portions with integrated windshields, and methods for forming such cab portions. A cab portion in accordance with one aspect of the invention includes an external flow surface having a generally rounded nose portion with a forward extremity, and a windshield aperture positioned only above and aft of the forward extremity of the rounded nose portion. The cab portion can further include a windshield disposed in the windshield aperture, wherein a contour of the external flow surface and the windshield extending from a position on the external flow surface beneath the windshield, aft over the windshield to a position on the external flow surface aft of and above the windshield, has a generally continuously smooth and unkinked shape. This arrangement can provide enhanced pilot visibility, reduced drag, increased aerodynamic performance, and reduced fuel consumption.

In a further aspect of the invention, the surface contour of the windshield can be generally conical. In yet a further aspect of the invention, the contour of the external flow surface and the windshield is a first contour intersecting a generally vertical plane passing through the external flow surface and the windshield at a center of the cab portion. A second contour of the external flow surface and the windshield intersecting a generally horizontal plane passing through the external flow surface and the windshield and extending aft over the windshield to a position on the external flow surface aft of the windshield can also have a generally continuously smooth and unkinked shape.

The invention is also directed toward methods for manufacturing an aircraft system. A method in accordance with one aspect of the invention includes fabricating an external flow surface having a generally rounded nose portion with a forward extremity and a windshield aperture positioned only above and aft of the forward extremity. The method can further include positioning a windshield in the windshield aperture, with a contour of the external flow surface and the windshield extending from a position on the external flow surface beneath the windshield, aft over the windshield to a position on the external flow surface aft of and above the windshield having a generally continuously smooth and unkinked shape.

BRIEF DESCRIPTION OF THE DRAWINGS

FIGS. 7A–7C illustrate top, front, and side elevation views, respectively, of an embodiment of the aircraft shown in FIG. 6.

DETAILED DESCRIPTION

The present disclosure describes aircraft cab portions having integrated windshields, and associated methods of manufacture and use. Many specific details of certain embodiments of the invention are set forth in the following description and in FIGS. 2–7C to provide a thorough understanding of these embodiments. One skilled in the art, however, will understand that the present invention may have additional embodiments, and that the invention may be practiced without several of the details described below.

Figure 2:
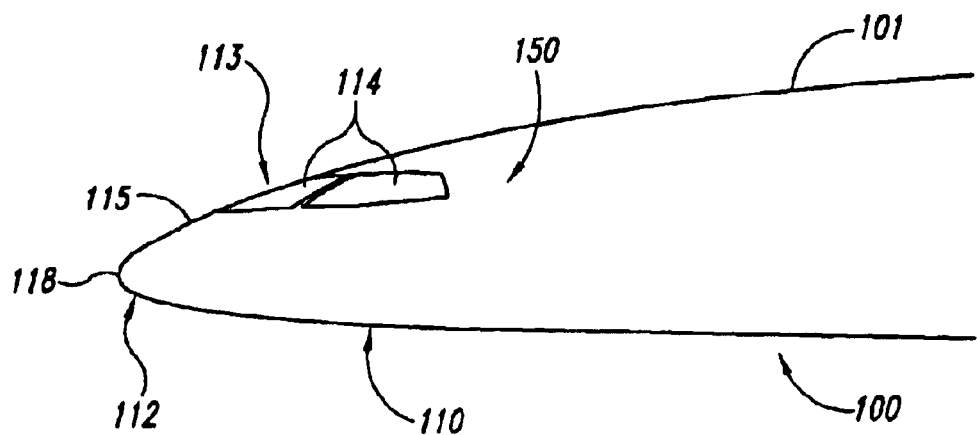
FIG. 2 is a partially schematic, side elevational view of an aircraft cab portion having a smoothly integrated windshield configured in accordance with an embodiment of the invention.

FIG. 2 is a partially schematic, side elevational view of an aircraft 100 having a fuselage 101 with a cab portion 110 configured in accordance with an embodiment of the invention. In one aspect of this embodiment, the cab portion 110 encloses a flight deck 150 which houses the pilots and the controls and instrumentation they operate and view. The cab portion 110 can further include a windshield 113 having one or more panes 114 which allow the pilots visual access to the region exterior of the aircraft 100. A nose 112 having a forward extremity 118 is positioned forward of and below the windshield 113 and can house additional equipment, such as one or more radars.

In one aspect of this embodiment, a fuselage contour 115 extending along the centerline of the aircraft 110 around the nose 112 and aft to the rest of the fuselage 101 has a generally smooth, continuous, unbroken and/or unkinked profile. In a further aspect of this embodiment, the nose 112 has a relatively sharp, but rounded shape, suitable for high subsonic and/or transonic flight, for example, at Mach numbers of from about 0.85 to about 1.2, and in a particular embodiment, from about 0.85 to about 0.98. In still a further aspect of this embodiment, the panes 114 which form the windshield 113 can have a curved shape to provide a seamless and/or nearly seamless integration with the curvature of the cab portion 110. For example, in one embodiment the panes 114 can be curved in multiple planes (i.e., can have a compound curvature). In another embodiment, the surface of the windshield 113 can form a section of a cone (e.g., the surface can be conical) and therefore can have a simple curvature. In one aspect of this embodiment, the windshield 113 can include at least two panes 114 on each side of the aircraft centerline to provide the pilots with a large field of view. In another embodiment, the windshield 113 can include fewer panes. For example, in a particular embodiment, the windshield 113 can include a single pane wrapping around the longitudinal centerline of the fuselage 101, with optional side panes positioned aft of the single, centrally mounted pane. In still further embodiments, other windows are provided in addition to the windshield 113, for example, "eyebrow" windows above the windshield 113 and/or "cheek" windows below the windshield 113. In any of these embodiments, glass suitable for manufacturing the windshield 113 is available from PPG Industries of Pittsburgh, Pa.

Figure 3:
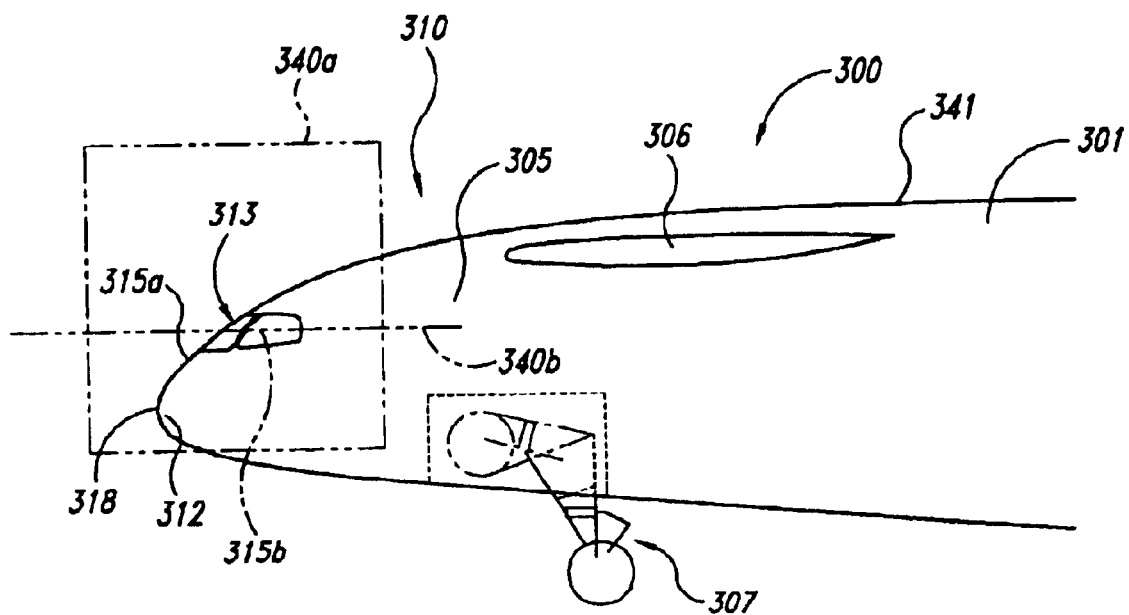
FIG. 3 is a partially schematic, side elevational view of a cab portion having a smoothly integrated windshield configured in accordance with another embodiment of the invention.

FIG. 3 is a partially schematic, side elevational view of an aircraft 300 having a fuselage 301 with a cab portion 310 configured in accordance with another embodiment of the invention. In one aspect of this embodiment, the cab portion 310 includes a rounded nose 312 having a forward extremity 318 and a blunter shape than the nose 112 described above with reference to FIG. 2. In a further aspect of this embodiment, the cab portion 310 includes an external flow surface 305 and a windshield 313 integrated with the external surface 305 so that the interfaces between the windshield 313 and the external flow surface 305 are generally smooth, continuous and unkinked. For example, when the cab portion 310 is intersected by a vertical plane 340a positioned approximately at a longitudinal centerline 341 of the fuselage 301, the resulting contour 315a is generally smooth, continuous and unkinked from a position starting aft of the forward extremity 318, passing over the windshield 313 to a position aft of and above the windshield 313 along the external flow surface 305. In a particular aspect of this embodiment, the first contour 315a is smooth and unkinked both where a lower edge of the windshield 313 meets the external flow surface 305, and where an upper edge of the windshield 313 meets the external flow surface 305. Another contour 315b defined by an intersection between a horizontal plane 340b and the cab portion 310 can also be generally smooth, continuous and unkinked from the windshield 313 aft over the external flow surface 305.

The windshield 313 can be defined by a section of a conical surface. In a particular aspect of an embodiment shown in FIG. 3 (and FIG. 2 as well), the conical surface can be oriented relative to the cab portion 310 so that a major axis of the cone defining the conical surface is not parallel to the longitudinal centerline 341 of the fuselage 301. Accordingly, the first contour 315a can be convex (when viewed from a position external to the cab portion) both over the windshield 313 and the cab portion 310.

In further aspects of an embodiment of the aircraft 300 shown in FIG. 3, a canard 306 can be mounted to the fuselage 301 to provide for pitch control and/or stability. A forward landing gear 307 can be positioned to retract into the fuselage 301 proximate to the cab portion 310. In other embodiments, the canard 306 can be eliminated and the landing gear 307 can have positions other than that shown in FIG. 3.

Figure 4:
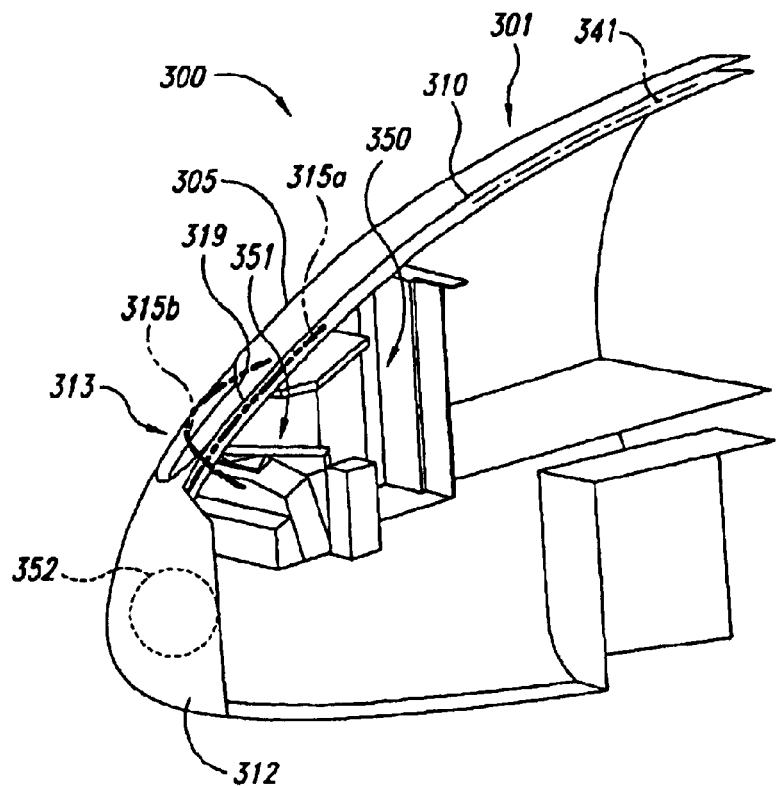
FIG. 4 is a partially schematic, cutaway front isometric view of the cab portion shown in FIG. 3.

FIG. 4 is a partially schematic, cutaway isometric view of the cab portion 310 described above with reference to FIG. 3, taken along the longitudinal centerline 341 of the aircraft 300. As shown in FIG. 4, the windshield 313 can be smoothly positioned within a windshield aperture 319 of the cab portion 310 to provide a seamless or nearly seamless transition to the adjacent external flow surface 305. As is also shown in FIG. 4, both the first contour 315a and the second contour 315b can have a generally smooth and unkinked shape over both the windshield 313 and the external flow surface 305. In a further aspect of this embodiment, a contour defined by an intersection between any plane (e.g., from horizontal to vertical) and both the windshield 313 and the adjacent external flow surface 305 can also be generally smooth, continuous and unkinked.

In addition to housing the windshield 313, the cab portion 310 can house a flight deck 350 including instrumentation and controls 351 accessible by the flight crew (not shown). The cab portion 310 can also house a radar 352 positioned forward of the instrumentation and controls 351 for providing positional information and/or weather-related information to the flight crew.

Figure 1A:
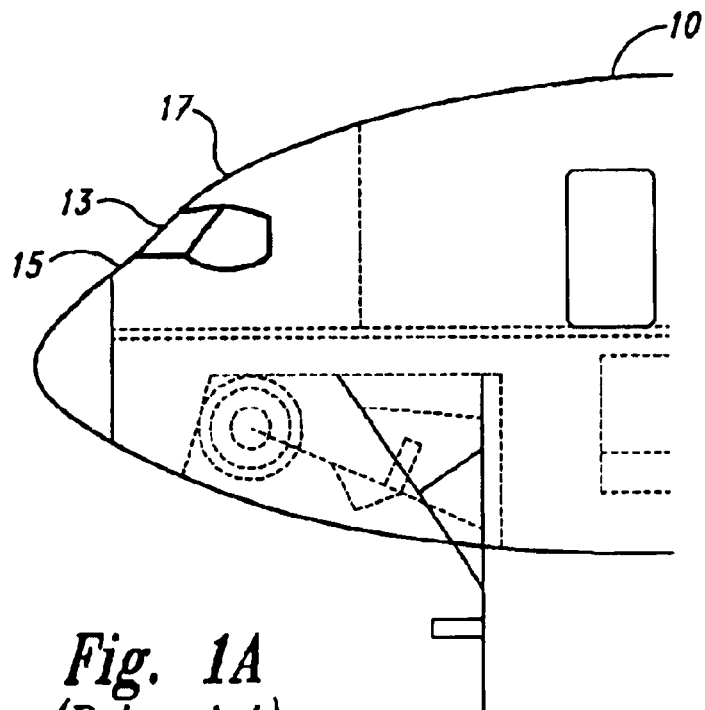
FIG. 1A is a side elevation view of an aircraft cab portion having a windshield arranged in accordance with the prior art.
Figure 1B:
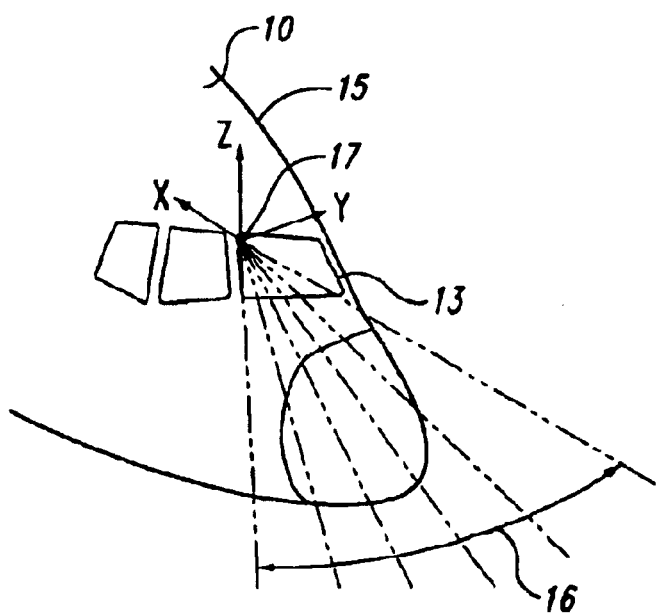
FIG. 1B is a partially schematic, top isometric view of the cab portion shown in FIG. 1A illustrating a corresponding field of vision.
Figure 5:
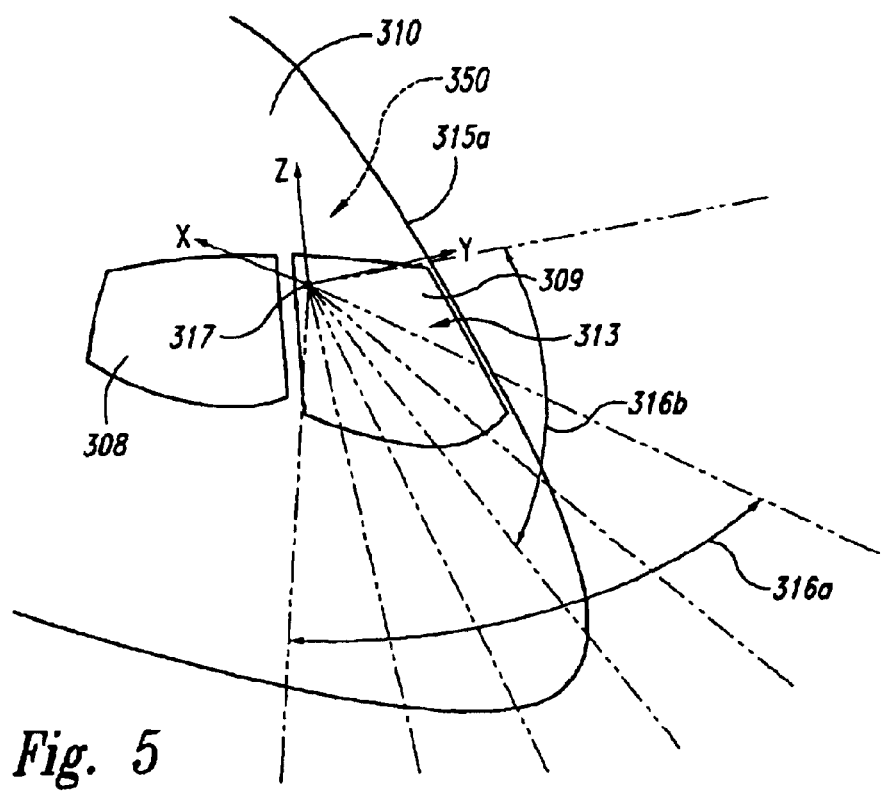
FIG. 5 is a partially schematic, top isometric view of the cab portion shown in FIGS. 3 and 4, illustrating an available field of vision in accordance with an embodiment of the invention.

FIG. 5 is a partially schematic, top view of the cab portion 310 described above with reference to FIGS. 3 and 4, illustrating the range of visibility available to the flight crew. In one aspect of an embodiment shown in FIG. 5, a pilot seated in the right seat of the flight deck 350 has an average reference eye position 317. From the pilot's eye position 317, the pilot has a lateral field of vision 316a through a right side, forward pane 309 of the windshield 313. In a particular aspect of this embodiment, the lateral field of vision 316a through the forward pane 309 has a value of about 68°, and in other embodiments the lateral field of vision 316a has other values. By comparing FIG. 5 to FIG. 1B, it is apparent that a cab portion 310 in accordance with an embodiment of the invention provides a lateral field of vision 316 that is greater than the field of vision 16a provided by the existing cab portion 10.

The lateral field of vision 316a through the forward pane 309 can be supplemented by visual access through a side pane 308. In a particular embodiment, the combined lateral field of view through the forward pane 309 and the side pane 308 can be about 150°. The pilot can also look upwardly and downwardly through a vertical field of vision 316b. In one aspect of this embodiment, the pilot can look upwardly by up to about 43° from the reference eye position 317, and downwardly by up to about 28° from the reference eye position for a combined vertical field of vision 316b of about 71°. In other embodiments, the vertical field of vision 316b can have other values.

Figure 6:
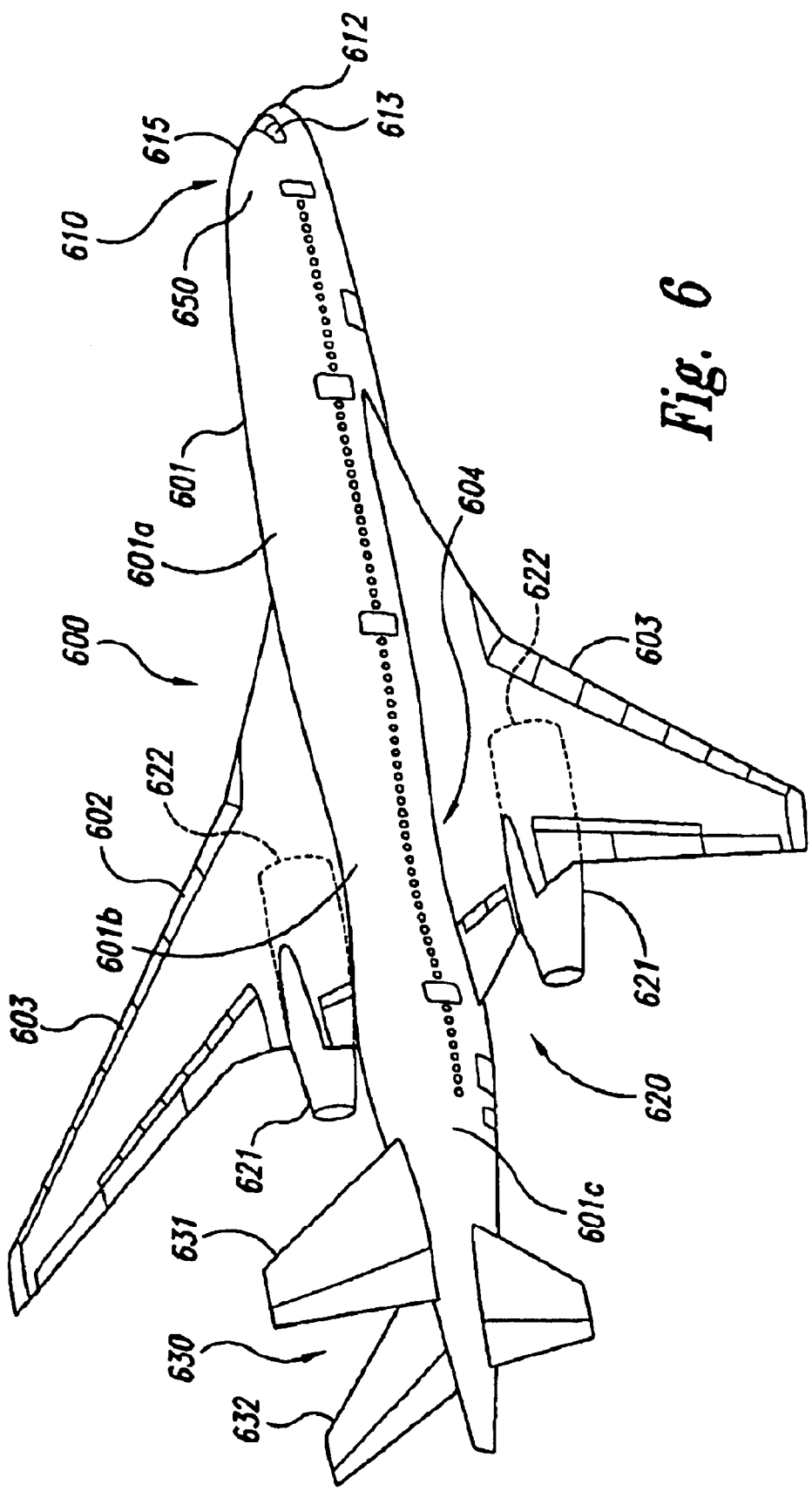
FIG. 6 is a top rear isometric view of an aircraft having a cab portion in accordance with another embodiment of the invention.

FIG. 6 is a partially schematic, rear isometric illustration of an aircraft 600 having a cab portion 610 with an integrated windshield in accordance with another embodiment of the invention. In one aspect of this embodiment, the cab portion 610 encloses a flight deck 650, and includes a nose 612, a windshield 613, and a generally smooth, continuous fuselage contour 615 extending around the nose 612 and aft above and below the windshield 613. The aircraft 600 can further include a fuselage 601 having a waisted portion 604 (e.g., the fuselage 601 can include a first portion 601a having a first cross-sectional area, a second portion 601b having a second cross-sectional area smaller than the first, and a third portion 601c having a third cross-sectional area greater than the second). A wing 602 depends from the fuselage 601 adjacent to the waisted portion 604. The wing 602 can include a swept wing leading edge 603, and can support a propulsion system 620. In one embodiment, the propulsion system 620 can include two nacelles 621, each aligned on opposite sides of the waisted portion 604, and each having an inlet 622 positioned aft of the wing leading edge 603. The aircraft 600 can further include an empennage 630 toward the rear of the fuselage 601. The empennage 630 can include a vertical stabilizer 631 having yaw control surfaces, and a horizontal stabilizer 632 having pitch control surfaces.

FIGS. 7A–7C illustrate top, front, and side views, respectively of the aircraft 600 shown in FIG. 6. As is shown in FIG. 7C, the aircraft 600 can include a forward-retracting nose gear 605, which the cab portion 610 can accommodate. As is also shown in FIG. 7C, the fuselage contour 615 has a generally smooth, continuous, unbroken and unkinked shape as it extends aft from the nose 612 over the windshield 613. As described below, this arrangement can have several advantages.

One feature of arrangements described above with reference to FIGS. 2–7C in accordance with embodiments of the invention is that the fuselage contour is generally smooth, continuous, unbroken and unkinked as it extends from the nose aft past the windshield. Accordingly, the airflow over the cab portion can be smoother and more uniform than the airflow over existing cab portions. One advantage of this arrangement is that the likelihood for the cab portion to generate shock waves (e.g., at high subsonic freestream Mach numbers) is reduced. Another advantage of this arrangement is that the likelihood for the cab portion to create "bubbles" of separated flow can be reduced. A consequence of both these advantages is that the overall drag of the aircraft can be reduced when compared to existing configurations. As a result, the fuel efficiency of the aircraft can be increased and the operating costs of the aircraft reduced. A further consequence of these advantages is that the noise level within the flight deck can be reduced when compared with existing arrangements. Accordingly, the crew can more easily communicate with each other and with the ground, and can be less susceptible to fatigue.

Another feature of the foregoing arrangements in accordance with embodiments of the invention is that the generally smooth fuselage contour can be structurally more efficient than existing arrangements which include a kink. An advantage of this feature is that the structure required to transmit loads from the cab portion to the rest of the aircraft can be simpler and therefore lighter, increasing the fuel efficiency of the aircraft. Another advantage of this arrangement is that the smooth contour can be easier to fabricate than a kinked contour, and can accordingly reduce the cost of constructing the aircraft.

Still a further advantage of the foregoing arrangements in accordance with embodiments of the invention is that the pilot's field of vision can be increased when compared to some existing arrangements. Accordingly, the pilot may be able to fly the aircraft at higher approach speeds and/or steeper approach attitudes without compromising his or her ability to meet FM regulations for acceptable fields of vision. Such regulations can include a requirement that, at an altitude of 100 feet, the pilot be able to see a distance down a runway at least equal to the distance the aircraft will cover in the next three seconds.

In other embodiments, the cab portion can have other arrangements and/or can be integrated with aircraft having other arrangements. For example, the cab portion can accommodate flight crew seating arrangements other than those for which two pilots sit side-by-side. The cab portion can be integrated with wide-body airliners, narrow-body airliners, and/or business jet aircraft. In any of these embodiments, the cab portion can support a crew escape hatch, and/or forward service/main doors and/or airstair doors, and/or operable (e.g., openable) flight deck windows.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. An aircraft, comprising:
    an aft-swept wing having a first portion on a first side of an aircraft centerline and a second portion on a second side of the centerline;
    a fuselage portion coupled to the wing, the fuselage portion being configured for sustained cruise flight at subsonic Mach numbers of at least 0.85, the fuselage portion including a cab portion, the cab portion including:
        an external flow surface having a generally rounded nose portion with a forward extremity, the external flow surface further having a windshield aperture positioned only above and aft of the forward extremity of the rounded nose portion; and
        a windshield disposed in the windshield aperture, wherein a contour of the external flow surface and the windshield extending from a position on the external flow surface beneath the windshield, aft over the windshield to a position on the external flow surface aft of and above the windshield has a generally continuously smooth unkinked shape;
    landing gear depending from at least one of the wing and the fuselage portion; and
    a propulsion system having a plurality of turbofan engines providing the sole propulsive force for sustained cruise flight at subsonic Mach numbers of at least 0.85.

2. The aircraft of claim 1 wherein the fuselage portion has a waisted cross-sectional shape including a first region having a first cross-sectional area, a second region aft of the first region having a second cross-sectional area smaller than the first cross-sectional area, and a third region aft of the second region having a third cross-sectional area greater than the second cross-sectional area.

3. The aircraft of claim 1, further comprising a canard depending from the fuselage portion.

4. The aircraft of claim 1 wherein the fuselage portion houses a pressurized passenger cabin.

5. A method for manufacturing an aircraft, comprising:
    fabricating a fuselage having an external flow surface with a generally rounded nose portion, the nose portion having a forward extremity and a windshield aperture positioned above and aft of the forward extremity of the rounded nose portion, the fuselage housing a passenger cabin, and being configured for sustained cruise flight at subsonic Mach numbers of at least 0.85; and
    positioning a windshield in the windshield aperture, with a contour of the external flow surface and the windshield extending from a position on the external flow surface beneath the windshield, aft over the windshield to a position on the external flow surface aft of and above the windshield having a generally continuously smooth and unkinked shape;

coupling the fuselage to an aft-swept wing having a first portion on a first side of the fuselage portion and a second portion on a second side of the fuselage portion;

coupling landing gear to at least one of the wing and the fuselage; and coupling a propulsion system to at least one of the wing and the fuselage, the propulsion system including a plurality of turbofan engines providing the sole propulsive force for sustained cruise flight at subsonic Mach numbers of at least 0.85.

6. The method of claim 5 wherein positioning the windshield includes positioning the windshield so that the contour of the external flow surface and the windshield intersects a generally vertical plane passing through the external flow surface and the windshield.

7. The method of claim 5 wherein positioning the windshield includes positioning the windshield so that the contour of the external flow surface and the windshield intersects a generally vertical plane passing through the external flow surface and the windshield at a longitudinal centerline of the cab portion.

8. The method of claim 5 wherein the contour of the external flow surface and the windshield is a first contour and wherein positioning the windshield includes positioning the windshield so that the first contour intersects a generally vertical plane passing through the external flow surface and the windshield at a longitudinal centerline of the cab portion, and wherein positioning the windshield includes positioning the windshield so that a second contour of the external flow surface and the windshield intersecting a generally horizontal plane passing through the external flow surface and the windshield and extending aft over the windshield to a position on the external flow surface aft of the windshield has a generally continuously smooth, unkinked shape.

9. The method of claim 5 wherein positioning a windshield includes positioning a windshield having an external surface that forms a portion of a conical surface.

10. The method of claim 5 wherein positioning the windshield includes positioning the windshield so that the contour is defined by an intersection between:

a plane oriented at one of any angle from vertical to horizontal; and both the external flow surface and the windshield.

11. The method of claim 5, further comprising disposing a radar within the external flow surface.

12. The method of claim 5 wherein positioning the windshield includes positioning a single panel extending across a generally vertical plane passing through a longitudinal centerline of the external flow surface.

13. The method of claim 5 wherein positioning the windshield includes a positioning a plurality of panels extending aft from a generally vertical plane passing through a longitudinal centerline of the external flow surface.

14. The method of claim 5 wherein positioning the windshield includes positioning the windshield so that the contour is generally smooth, continuous and unkinked at a first joint between a lower edge of the windshield and the external surface, and at a second joint between an upper edge of the windshield and the external surface.

15. The method of claim 5, further comprising disposing a crew station within the external flow surface, the crew station including aircraft controls.

* * * * *

UNITED STATES PATENT AND TRADEMARK OFFICE
CERTIFICATE OF CORRECTION

PATENT NO. : 6,817,571 B2
DATED : November 16, 2004
INVENTOR(S) : Kevin M. Retz et al.

It is certified that error appears in the above-identified patent and that said Letters Patent is hereby corrected as shown below:

Column 5,
Line 63, "FM" should be -- FAA --;

Signed and Sealed this

Fifteenth Day of March, 2005

JON W. DUDAS
*Director of the United States Patent and Trademark Office*